United States Patent Office 2,747,363
Patented May 29, 1956

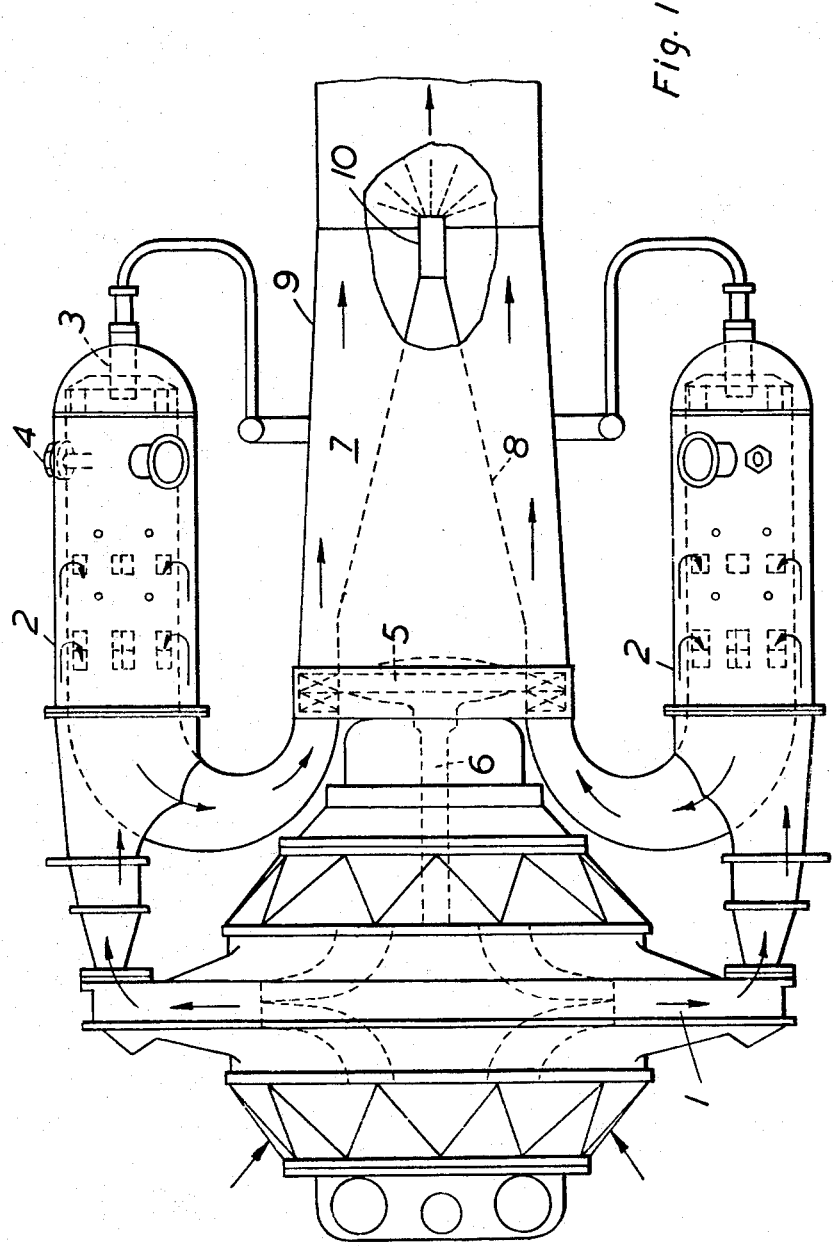

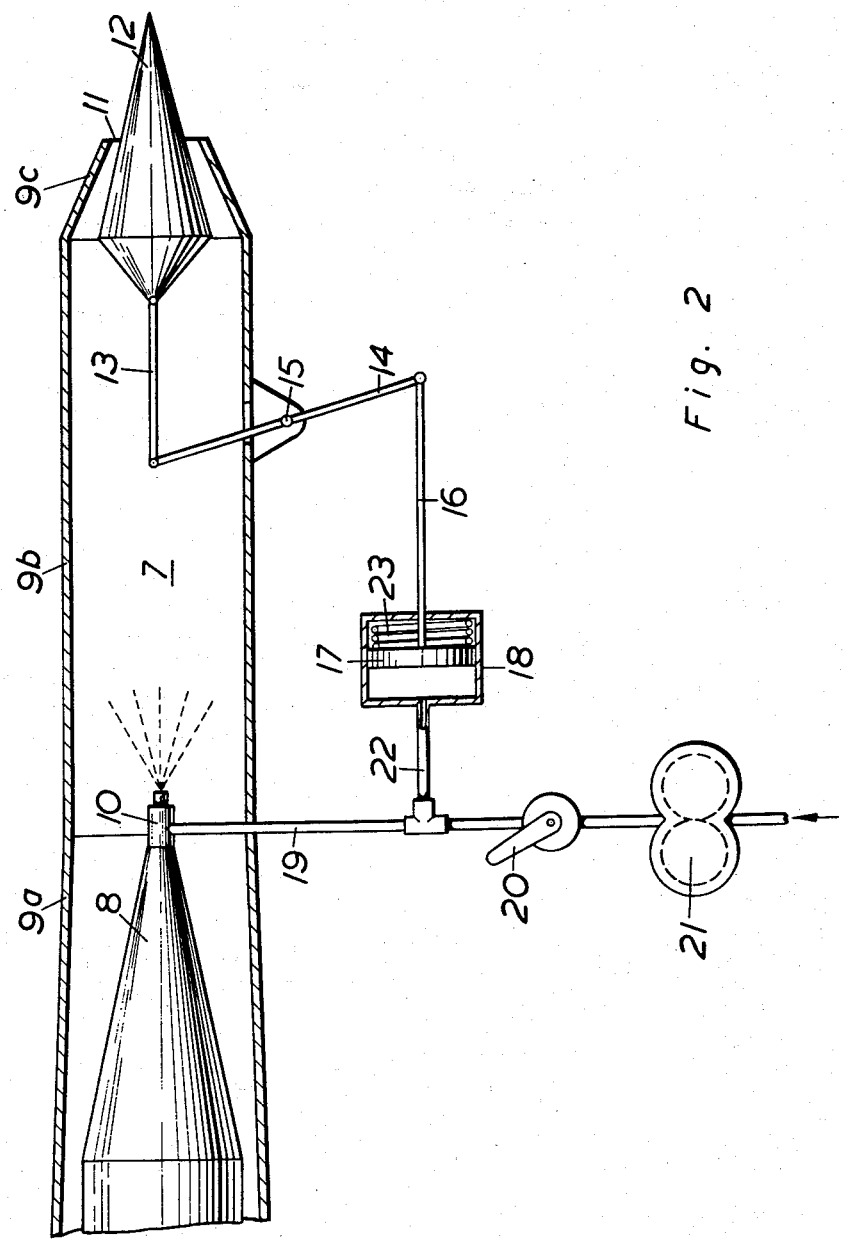

2,747,363

JET PROPULSION PLANT WITH INTERCONNECTED AFTERBURNER AND JET NOZZLE AREA CONTROL

Henry Cohen, Newcastle-upon-Tyne, and John Henry Hamilton Darth, Sutton, England, assignors to Power Jets (Research and Development) Limited, London, England, a British company Application October 13, 1952, Serial No. 314,536

Claims priority, application Great Britain September 14, 1944

7 Claims. (Cl. 60—35.6)

The invention relates to the augmentation of the thrust of aircraft jet propulsion plant by "reheat" or "afterburning," that is by burning additional fuel in the jet pipe. In particular the invention is concerned with cases where the jet propulsion plant is a gas turbine unit of the type in which air is compressed in a compressor, fuel is burnt in this air, and the combustion gases are used to drive a turbine which drives the compressor, the combustion gases being then ejected through an exhaust duct to atmosphere to form a propulsive jet stream.

When additional fuel is burnt in the exhaust duct of a gas turbine unit, the pressure therein is increased. Thus an increased back pressure is exerted on the turbine and there is a serious risk of overheating. An object of this invention is to reduce this risk by automatically relieving the back pressure under reheat conditions.

According to the invention, the jet pipe of a jet propulsion plant is provided with a variable area nozzle, the control of which is inter-related with the control of the reheat fuel supply, so that when this fuel supply is turned on, the nozzle area is increased.

An embodiment of the invention is illustrated in the accompanying drawings of which:

Figure 1 is a general view of a gas turbine unit to which the invention may be applied.

Figure 2 is a diagrammatic view of the exhaust pipe of the unit shown in Figure 1, and in effect forms a continuation on the right hand side of that figure.

Referring to Figure 1, the gas turbine unit comprises a double sided centrifugal compressor, generally indicated at 1, an axial flow turbine 5, and a shaft 6 carrying the compressor and turbine. Lying around the turbine is a ring of combustion chambers 2 provided with fuel burners 3 and spark plug 4. On the downstream side of the turbine, there is a jet pipe 9 containing a tapered fairing 8 forming with the jet pipe 9 the upstream part of an exhaust duct 7.

The compressor 1 delivers air to the combustion chambers 2 into which fuel is injected through burners 3 and where it is ignited by spark plug 4. The hot gases pass through the turbine 5, thus driving the compressor through shaft 6, and are finally ejected to atmosphere as a propulsive jet stream through exhaust duct 7.

It will of course be understood that the present invention is not limited to the particular gas turbine unit described above.

In order to augment the thrust of the propulsive jet stream, the hot gases in the exhaust duct 7 are further energized by burning additional or "reheat" fuel therein. On the downstream end of the conical fairing 8 is mounted a reheat fuel burner, generally indicated at 10. This burner will preferably be associated with means for maintaining the combustion of the fuel, notwithstanding the high velocity of the gas stream, and the whole arrangement may conveniently be of the type described in copending United States patent application Serial No. 630,950, filed November 26, 1945 (now Patent No. 2,639,581), of which the present application is a continuation-in-part.

Referring now to Figure 2, the jet pipe includes a tapered portion 9a which is connected to a parallel portion 9b leading in turn to a tapered section 9c which terminates in a jet nozzle 11. Mounted within the jet nozzle is a conical obturating member 12 which is movable axially in and out of the nozzle 11 to vary the effective area thereof. The conical member is connected to an axially movable rod 13 which is pivotally attached to one end of a lever 14 which swings about a pivot 15 fixed in relation to the jet pipe. The other end of the lever is pivotally attached to rod 16 which carries a piston 17 operating in a cylinder 18. The piston is urged to the left as shown in the drawing by spring 23.

The reheat fuel burner 10 is connected by a pipe 19 to a control valve 20 and a pump 21 which draws fuel from the supply tank (not shown). A branch pipe 22 leads to the interior of the cylinder 18 so that fuel pressure will be exerted on one face of the piston 18 in a sense opposed to the pressure of spring 23.

When the reheat fuel supply is turned on by opening valve 20 and a predetermined pressure is reached, the fuel pressure will move the piston 17 against the spring 23. The rod 16 is thus moved to the right and the conical member 12 is moved to the left, to provide an increased jet nozzle area. The increased back pressure on the turbine 5 is accordingly relieved and the risk of overheating reduced.

When the reheat fuel supply is turned off, the pressure of spring 23 reasserts itself, so that the piston 17 returns to its original position, and the jet nozzle area is reduced to the size appropriate for normal operating conditions.

We claim:

1. An aircraft jet propulsion power plant comprising a jet pipe having a jet nozzle for the rearward discharge of a propulsive jet stream, obturating means to vary the area of said jet nozzle, a fuel burner within said jet pipe, means for supplying fuel to said burner including controlling means operable to turn said fuel supply on and off and means operatively interconnected with said controlling means and operable to move said obturating means to increase the jet nozzle area when said controlling means is operated to turn on the supply of fuel to the burner.

2. An aircraft jet propulsion power plant comprising a jet pipe having a jet nozzle for the rearward discharge of a propulsive jet stream, obturating means to vary the area of said jet nozzle, a fuel burner within said jet pipe, means for supplying fuel under pressure to said burner, and means, connected to the fuel supply means, to move said obturating means to increase the jet nozzle area responsively to a predetermined pressure of said fuel supply.

3. An aircraft jet propulsion power plant comprising a gas turbine unit having a rearwardly extending exhaust pipe terminating in a jet nozzle, obturating means to vary the area of said nozzle, a fuel burner within the exhaust pipe, means for supplying fuel to said burner including controlling means operable to turn said fuel supply on and off, and means operatively interconnected with said controlling means and operable to move said obturating means to increase the jet nozzle area when said controlling means is operated to turn on the supply of fuel to the burner.

4. An aircraft jet propulsion power plant comprising a gas turbine unit having a rearwardly extending exhaust pipe terminating in a jet nozzle, obturating means to vary the area of said nozzle, a fuel burner within said exhaust pipe, means for supplying fuel under pressure to said burner, and means, connected to said fuel supply means, to move said obturating means to increase the jet nozzle area responsively to a predetermined pressure of said fuel supply.

5. An aircraft jet propulsion power plant comprising a jet pipe terminating in a rearwardly directed variable-area nozzle, a fuel burner within said jet pipe, means for supplying fuel to said burner, means for varying the area of said variable area nozzle, means for controlling the supply of fuel to said burner, and means interconnecting the means for varying the area of the variable area nozzle and the control means for the supply of fuel so that as the fuel supply is turned on, the area of the nozzle is increased.

6. An aircraft jet propulsion power plant comprising a gas turbine unit having a rearwardly extending exhaust pipe terminating in a variable-area nozzle, a fuel burner within said exhaust pipe, a fuel supply conduit leading to said burner, a cylinder, a piston operating in said cylinder, a branch conduit connecting said fuel supply conduit to said cylinder, and linkage means between said piston and said variable area nozzle operable to increase the jet nozzle area when fuel is admitted to the cylinder.

7. An aircraft jet propulsion power plant comprising a gas turbine unit having a rearwardly extending exhaust pipe terminating in a jet nozzle, obturating means to vary the area of said nozzle, a fuel burner within said exhaust pipe, a fuel supply and control system including a control valve and a pressure fuel pump for said burner, a fuel pressure operated piston type servo-motor connected to the fuel system and having its piston connected to said obturating means to move said means to increase the jet nozzle area in response to supplying fuel to said burner.

References Cited in the file of this patent

UNITED STATES PATENTS

| | | |
|---|---|---|
| 2,280,835 | Lysholm | Apr. 28, 1942 |
| 2,408,099 | Sherman | Sept. 24, 1946 |
| 2,563,270 | Price | Aug. 7, 1951 |
| 2,563,745 | Price | Aug. 7, 1951 |
| 2,565,854 | Johnstone et al. | Aug. 28, 1951 |
| 2,639,581 | Cohen et al. | May 26, 1953 |